United States Patent [19]

Lacker et al.

[11] Patent Number: 4,944,576
[45] Date of Patent: Jul. 31, 1990

[54] FILM WITH PARTIAL PRE-ALIGNMENT OF POLYMER DISPERSED LIQUID CRYSTALS FOR ELECTRO-OPTICAL DEVICES, AND METHOD OF FORMING THE SAME

[75] Inventors: Anna M. Lacker, Los Angeles; J. David Margerum, Woodland Hills; Elena Ramos, Santa Monica; Willis H. Smith, Jr., Newbury Park; Khoon C. Lim, Agoura, all of Calif.

[73] Assignee: Hughes Aircraft Company, Los Angeles, Calif.

[21] Appl. No.: 170,955

[22] Filed: Mar. 21, 1988

[51] Int. Cl.$^5$ ................................................ G02F 1/13
[52] U.S. Cl. .............................. 350/334; 350/347 V; 350/346; 427/12; 427/58
[58] Field of Search ............... 350/334, 339 R, 347 E, 350/346, 347 V; 427/58, 12, 26, 47

[56] References Cited

U.S. PATENT DOCUMENTS

| | | | |
|---|---|---|---|
| 3,585,381 | 6/1971 | Hodson et al. | 350/351 |
| 3,872,050 | 3/1975 | Benton et al. | 350/351 |
| 4,579,423 | 4/1986 | Fergason | 350/334 |
| 4,685,771 | 8/1987 | West et al. | 350/347 V |

*Primary Examiner*—Stanley D. Miller
*Assistant Examiner*—Anita E. Pellman
*Attorney, Agent, or Firm*—V. D. Duraiswamy; A. W. Karambelas

[57] ABSTRACT

A polymer dispersed liquid crystal (PDLC) film, along with various fabrication methods that enable partial prealignment of the film's LC bubbles, are described. The film is formed with a matrix of liquid crystal bubbles. Individual liquid crystals within the bubbles are partially, but substantially less than fully, aligned in a given direction. Partial alignment is attained by the controlled application of an electric or magnetic field, or a mechanical flow, during photopolymerization. The resulting films retain the positive qualities of prior PDLCs, and in addition exhibit generally lower threshold and operating voltages, and can be used as tunable birefringent films in the infrared region.

15 Claims, 7 Drawing Sheets

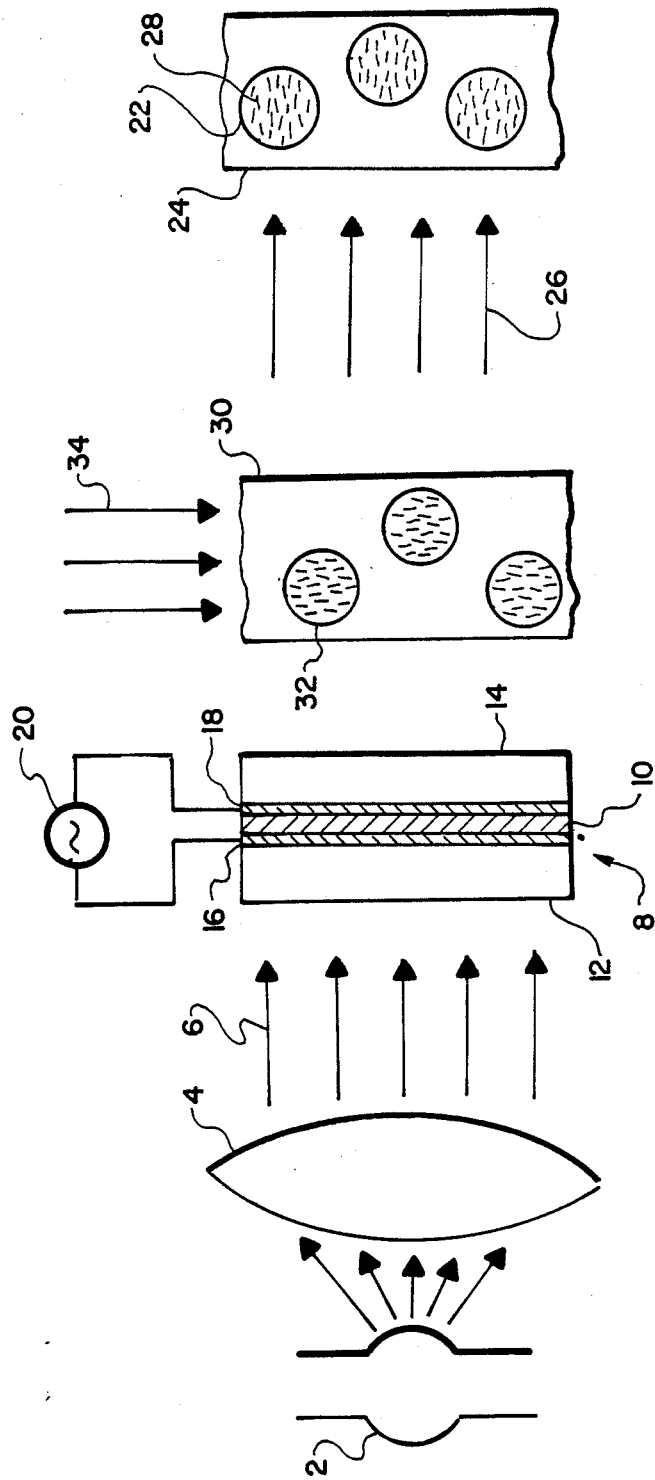

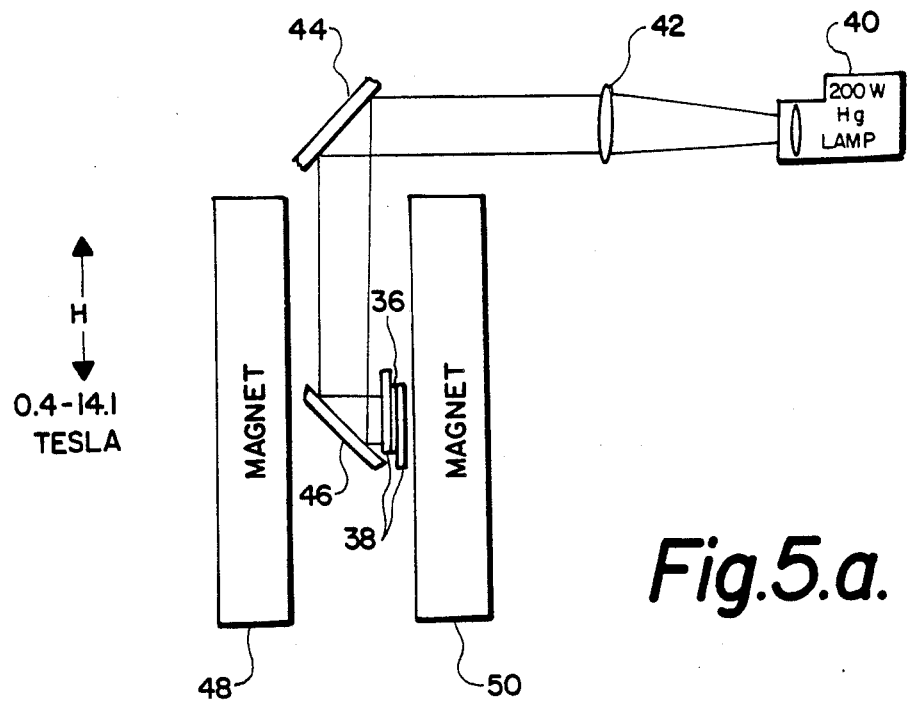
*Fig.5.a.*
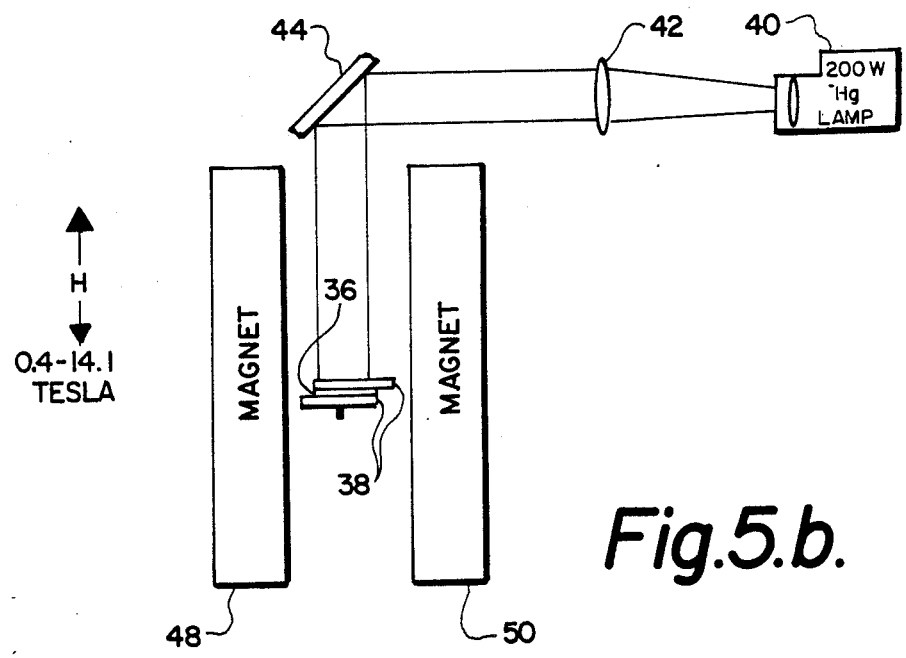
*Fig.5.b.*

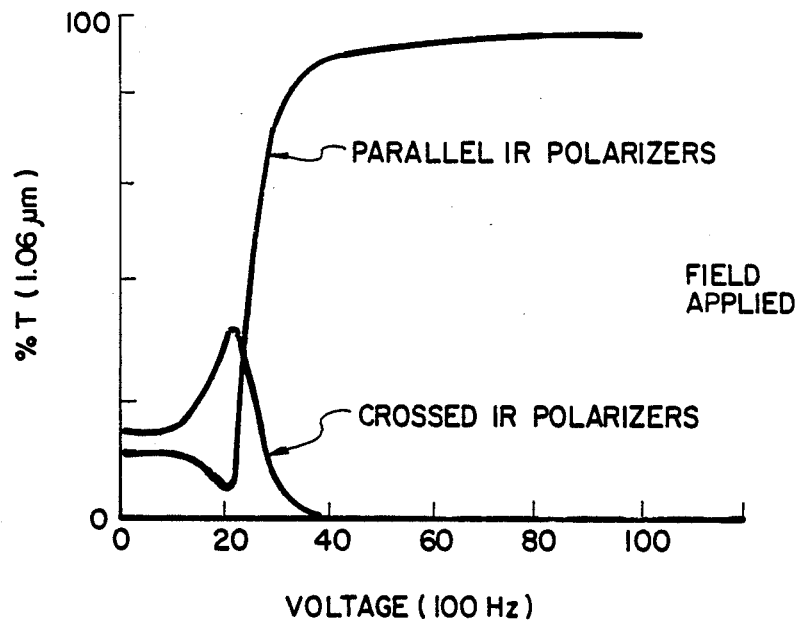
Fig.10.a.
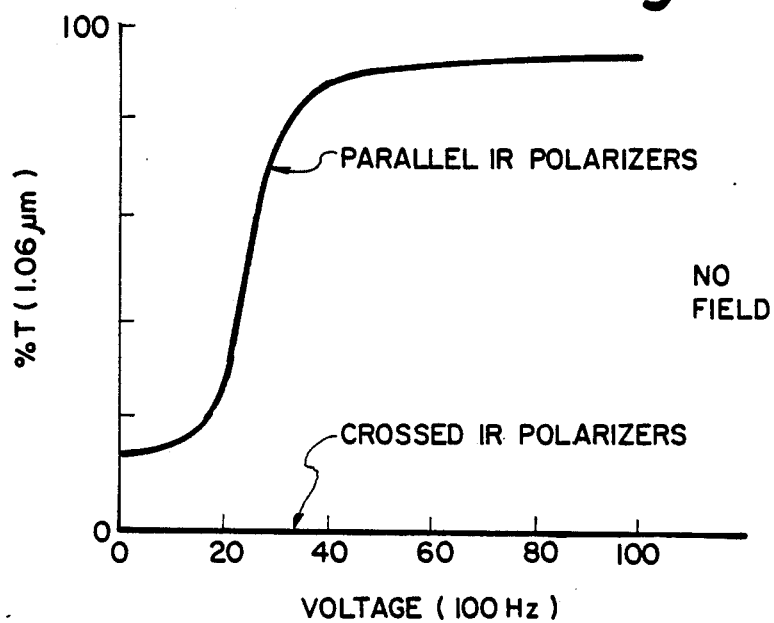
Fig.10.b.

FILM WITH PARTIAL PRE-ALIGNMENT OF POLYMER DISPERSED LIQUID CRYSTALS FOR ELECTRO-OPTICAL DEVICES, AND METHOD OF FORMING THE SAME

BACKGROUND OF THE INVENTION

1. Field of the Invention

This invention relates to polymer dispersed liquid crystal films, and to methods of forming the same by controlling the conditions of photopolymerization to control the properties of the film.

2. Description of the Related Art

A new type of material referred to as a polymer dispersed liquid crystal (PDLC) film has been developed recently with applications to various electro-optical switching devices. The material is described in U.S. Pat. No. 4,688,900, issued Aug. 25, 1987 to Joseph W. Doane et al., and assigned to Kent State University. The PDLC film consists of droplets or bubbles of liquid crystal molecules (LC) dispersed in a clear or light transmitting, flexible plastic sheet or film. The PDLC film is capable of being thermally, electrically, magnetically or electromagnetically addressed, causing the material to be reversibly switched between a light scattering mode and a light transmissive mode. The material is optically responsive to strain, so that under tension it acts as a polarizer that transmits one component of plane polarized light while scattering the other component.

The PDLC is prepared by dissolving liquid crystal molecules in an uncured monomer resin, and then curing or polymerizing the resin so that bubbles or droplets of liquid crystal spontaneously form and are uniformly dispersed throughout the matrix. The exact "curing" method is not described, but it is known that PDLCs may be cured by a photopolymerization process of exposure to ultraviolet light, as described by Vaz, Smith and Montgomery in *Mol. Cryst. Liq. Cryst.*, 146. pp. 1-15 (1987). The patent also suggests that epoxy resins which are curable by UV radiation are useful. The resulting liquid crystal droplets are described in the patent as being of uniform size and spacing, and having a diameter ranging upward from about 0.2 microns depending primarily upon the curing procedure and the specific materials used.

The PDLC is described as exhibiting a reversible, high contrast optical response from an opaque scattering mode to a clear light transmission mode when either the temperature of the material is changed, or an electric field is applied. The material is optically responsive to strain, whereby under tension it acts to polarize incident light.

When cured under normal conditions, a relatively high operating voltage of about 60-100 volts is required to maintain the film in a light transmissive state, and a relatively high threshold voltage of perhaps about 40 volts is also required to initiate the transition from light scattering to light transmission. These high voltages require the use of relatively expensive electronic drivers.

The Doane patent also describes a curing process in which the film is cured in the presence of a magnetic field of sufficient strength to cause the liquid crystal molecules in the droplets to align in the direction of the field. When the curing process is complete, the alignment becomes permanent and persists upon removal of the applied field. By curing while applying the magnetic field directed in the plane of the film, the resultant film can act as a switchable polarizer by off-state scattering of light polarized in the alignment direction, and by the absence of scattering when an electrical field is applied in the transverse direction across the film.

The Doane patent also describes a PDLC film cured in the presence of a transverse electrical field to give a film which is transparent in the off-state, and which becomes scattering when exposed to a high intensity electromagnetic source. Such a film acts as a nonlinear device which is normally transparent and can be used as a protective coating against a high intensity laser beam.

An alternate method is described in the patent for aligning the liquid crystal molecules during cure, involving the application of a compressive strain to the film. With this approach the liquid crystal molecules are aligned parallel to the surface of the film, rather than perpendicular, and switch from a light scattering to a transmissive mode when an AC voltage of sufficient strength is applied.

A related type of liquid crystal film is described in U.S. Pat. No. 4,435,047 to J. L. Fergason. In this patent a liquid crystal is dispersed in an aqueous polyvinyl alcohol slurry, and cast and dried to a thin film. The resulting encapsulated liquid crystal film, which is produced by Taliq Corporation, has relatively high operating and threshold voltages, similar to the unaligned PDLC films of Doane et al.

A related patent application by J. D. Margerum et al., "Polymer Dispersed Liquid Crystal Film Devices, and Method of Forming the Same", was filed Jan. 5, 1988 under Ser. No. 141,033, and assigned to Hughes Aircraft Company, the assignee of the present application. This application describes the control of various PDLC film characteristics, such as threshold and operating voltages, contrast ratio, absolute transmission levels, transmission wavelengths and optical response times, by a corresponding control over various photopolymerization conditions, including the UV intensity, temperature, LC concentration, initiator concentration and UV wavelength. However, for a given LC bubble size the required operating and threshold voltages may still be undesirably high.

SUMMARY OF THE INVENTION

In view of the above problems, the principal goal of the present invention is to provide a PDLC film, and a method of manufacturing the film, which retains the advantages of prior PDLC films, and yet switches from a light scattering to an optically transmissive state at a substantially lower threshold voltage, and also requires a substantially lower operating voltage in the transmissive state. A further desire is to achieve this goal with a fabrication process that is relatively simple and inexpensive, and yet reliable and repeatable.

The invention provides for a method of forming a PDLC that is superficially somewhat similar to the method described in the Doane patent identified above. A solution is formed by dissolving a liquid crystal in a polymerizable monomer system, and the solution is polymerized to form a film having a dispersion of liquid crystal bubbles therein. The liquid crystal molecules within the bubbles are directed, by means of an electric or magnetic field or a mechanical flow, to partially align in a predetermined direction during polymerization. However, unlike the Doane patent in which a substantial full alignment of the liquid crystal molecules with the applied field is described, in the present invention the crystal alignment is deliberately controlled so that substantially less than full alignment is achieved. This results in a film having properties very unlike those of Doane. For example, in film cured with transverse fields, rather than permitting essentially full optical transmission until exposed to high electromagnetic fields (e.g., intense laser beam) and then limiting transmission beyond that level as in Doane, the new type of film can be used to inhibit optical transmission until a voltage threshold is reached, and thereafter permit increasing levels of transmission with increasing voltage until essentially full transmission is reached. This mode of operation is actually more similar to PDLCs cured in the absence of an electric or magnetic field, but yields a generally lower voltage threshold and operating voltage, and a higher optical contrast ratio, than such PDLCs. Thus, although the fabrication process involves the application of an external field, as in Doane, the operating characteristics of the resulting film are more analogous to (although generally better than) a film cured without an applied field or compression. An important feature is the discovery that the electrical field applied during curing to control the PDLC properties can be substantially lower than the fields necessary to change the scattering properties of the film once it is formed.

In the preferred embodiments, partial directional alignment of the liquid crystal molecules is achieved by controlling the strength of an applied magnetic or electric field, or by inducing material flow during cure. The material flow alignment effect is preferably achieved by forming the film between plastic sheets as they are compressed by a pair of opposed rollers. In either case the degree of liquid crystal alignment is made great enough to substantially change the voltage threshold for optical transmission relative to non-aligned liquid crystal. Depending upon the desired application, the liquid crystal molecules can be partially aligned directionally either generally parallel, or perpendicular, or tilted to the film plane. The method thus provides for the formation of a PDLC film with tunable birefringence capabilities for infrared light, where the particular birefringence for any given film is determined by the initial degree of liquid crystal alignment with the applied field or flow during cure and the strength of the electrical field applied to the PDLC film after curing.

In another embodiment, the liquid crystal is selected to have a positive dielectric anisotropy below a crossover frequency, and a negative dielectric anisotropy above the crossover frequency. The frequency of the electric field which is applied during cure is selected to be either greater or less than the crossover frequency, depending upon the desired operating characteristics for the film.

These and other features and advantages of the invention will be apparent to those skilled in the art from the following detailed description of preferred embodiments, taken together with the accompanying drawings, in which:

DESCRIPTION OF THE DRAWINGS

FIG. 1 is a block diagram of a system for applying an electric field to a PDLC during cure;

FIGS. 2 and 3 are illustrative sectional views showing the partial alignment of liquid crystal molecules to electric or magnetic fields that are applied during cure respectively transverse and parallel to the film;

FIGS. 5(a) and 5(b) are block diagrams of setups for applying a magnetic field respectively transverse and parallel to the film plane during cure;

FIGS. 10(a) and 10(b) are graphs comparing voltage-transmission characteristics of PDLC films in the infrared region between crossed polarizers, where in 10(a) the PDLC has been formed with partial directional alignment by an applied magnetic field during cure, while in 10(b) no field was applied during cure;

DETAILED DESCRIPTION OF PREFERRED EMBODIMENTS

Figure 4:
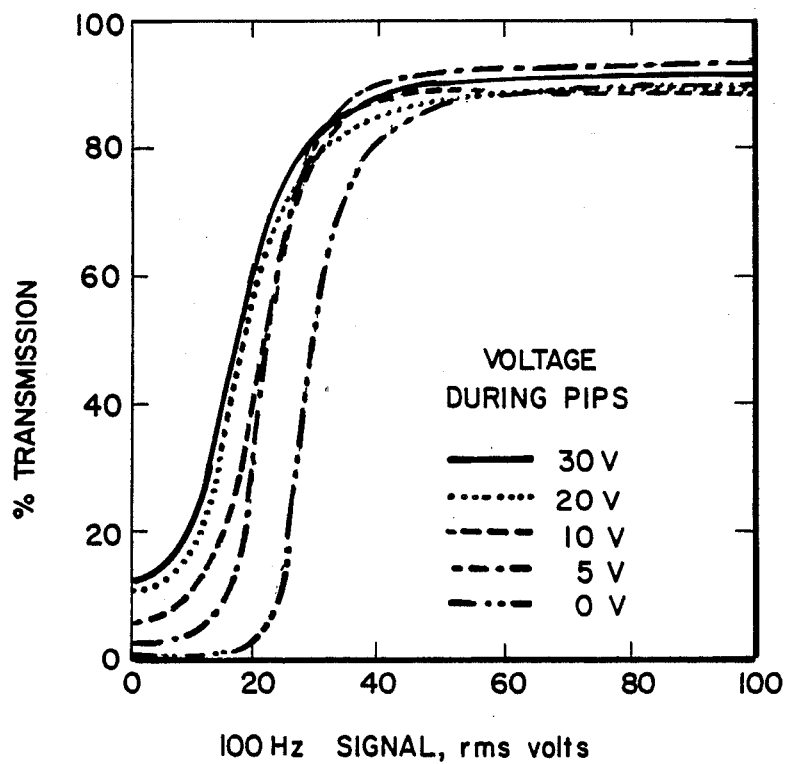
FIG. 4 is a graph relating the voltage-transmission characteristics of a PDLC to various electric field strengths applied during cure.
Figure 11:
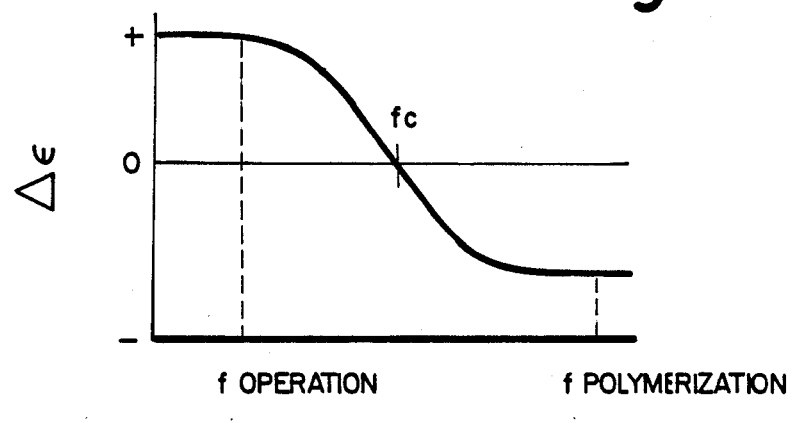
FIG. 11 is a graph illustrating the frequency dependence of a dual frequency liquid crystal that can be used with the invention.
Figure 6:
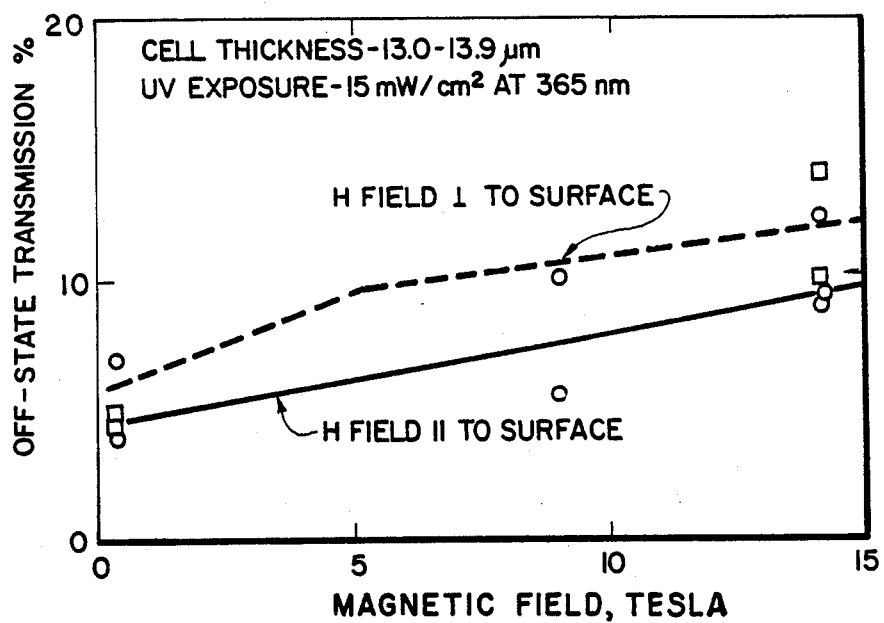
FIGS. 6, 7 and 8 are graphs relating the off-state optical transmission, threshold voltage and contrast ratio of PDLC films, respectively, to the magnetic field strength applied during cure.
Figure 7:
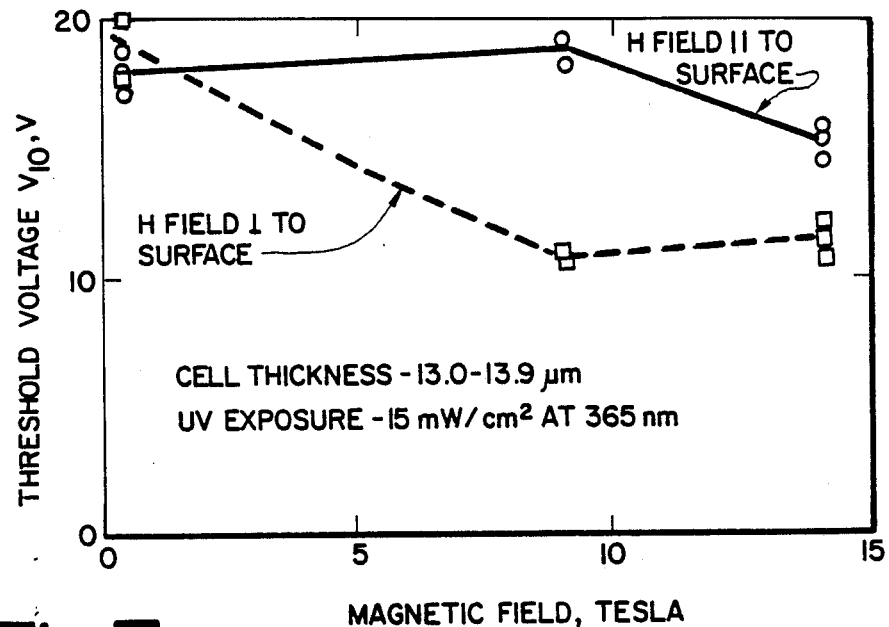
Figure 8:
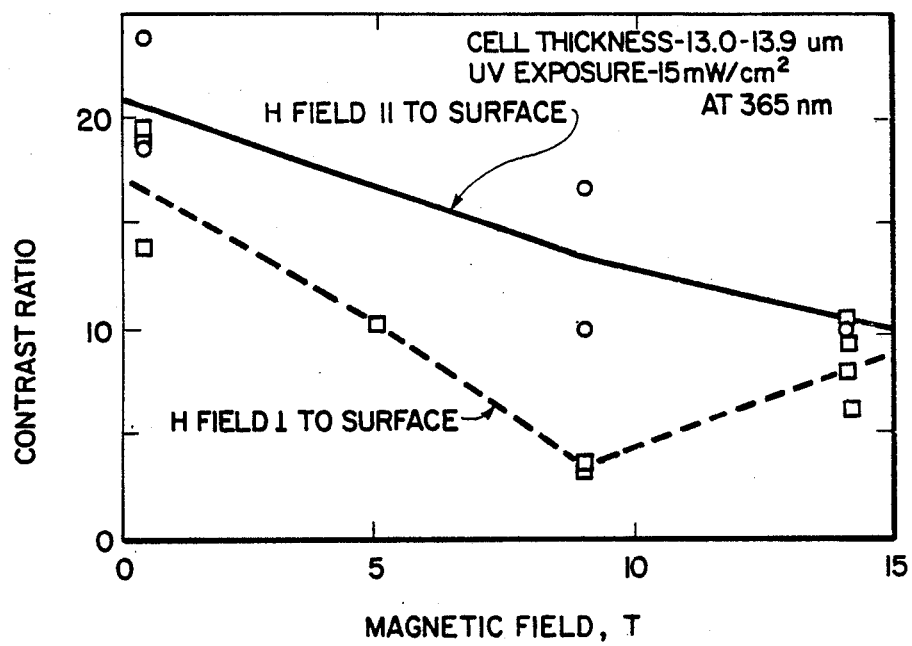
Figure 9:
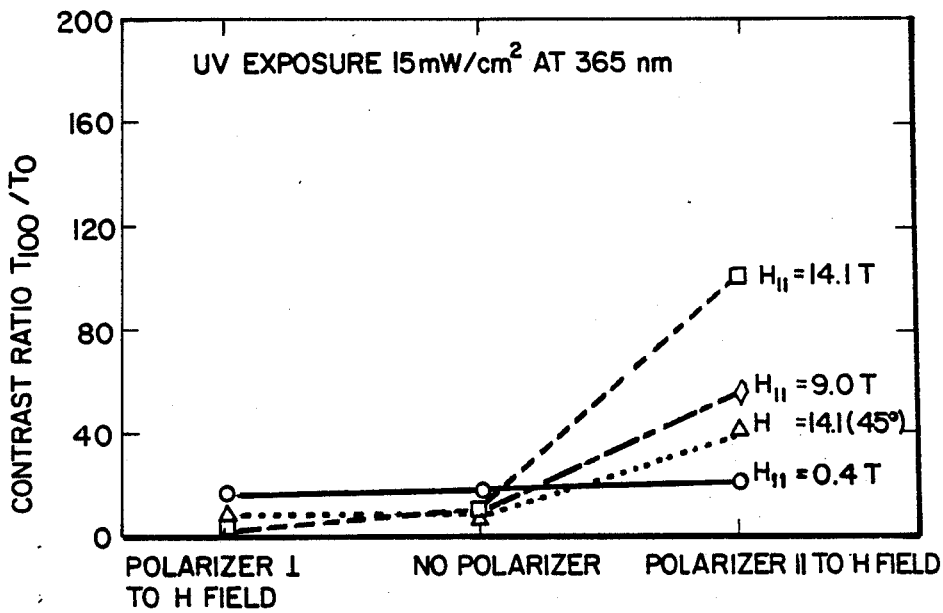
FIG. 9 is a graph relating the contrast ratio of PDLC film to light polarization for various levels of magnetic field during cure.

The invention uses an applied electric or magnetic field, or a material flow force, to partially align the liquid crystal molecules in a PDLC during cure. By controlling the applied field or flow force so that there is partial directional alignment of the LC molecules in the droplets as they are formed, along with a substantial random LC orientation, a control over electro-optical light scattering and birefringent properties of the PDLC film is achieved. The pre-alignment birefringence effect is most important in the infrared region, where the light scattering is decreased as the wavelength of light becomes substantially larger than the LC droplet size. It has been found that the threshold and operating voltage levels to reduce light scattering of a PDLC film depend upon the degree of induced directional pre-alignment of the LC droplets. Thus, the invention provides a method to control the extent and direction of LC droplet pre-alignment in the film, which strongly affects the electro-optical properties of the film. The birefringence of the film is controlled by applying an appropriate liquid crystal alignment mechanism during cure, resulting in electrically tunable birefringent films, particularly for the infrared region.

A setup for fabricating a PDLC film with liquid crystals partially aligned transverse to the film plane is illustrated in FIG. 1. Radiation from a mercury lamp 2, preferably of about 200 watts, is collimated by lens 4 into an ultraviolet beam 6. The beam is directed onto the structure 8 which houses the PDLC. A selected LC is added to a monomer/initiator to obtain a homogeneous, isotropic LC-monomer solution 10, typically 0.25–0.5 mil thick. The solution 10, is sandwiched between glass plates 12 and 14, which are respectively coated with ITO (indium tin oxide) electrodes 16 and 18. An AC Voltage source 20 is connected across the two electrodes 16, 18 to establish an electric field through the solution. Application of the ultraviolet beam 6 to the solution cures it into a film, while at the same time the electric field causes the liquid crystal molecules to partially align in the direction of the field. While the cure will normally take a few minutes to complete, it has been found that the partial liquid crystal alignment and droplet formation are both substantially established within the first few seconds of cure.

FIG. 2 illustrates a partial alignment attained for the liquid crystal molecules. The curing process produces a matrix of liquid crystal bubbles 22 within the completed film 24. If the film has been cured in the presence of an electric or magnetic field transverse to the film plane in the direction of arrows 26, the individual liquid crystal molecules 28 within the bubbles will be partially aligned in the direction of the field, but when cured with a proper field strength will still retain a substantial element of random orientation. As explained in detail in the Margerum et al. application referred to previously, the liquid crystal bubble size can be controlled by controlling various polymerization conditions, such as the UV exposure intensity and wavelength, temperature, LC concentration, and concentration of polymerization initiator within the monomer system. This in turn can be used to control various film parameters, such as the threshold and operating voltages for optical transmission, the contrast ratio, absolute transmission levels, transmission wavelengths and optical response times By keeping the strength of field 26 to a level less than that at which substantially full liquid crystal alignment is attained, the desired partial alignment results; the degree of alignment varies in accordance with the field strength. The film 24 can be used for various types of display modules, such as in automobile dashboards and other types of electro-optical switching devices.

The film can be cured by either thermal or UV photo-initiated polymerization. The selected LC is added to a monomer/initiator to obtain a homogeneous, isotropic LC-monomer solution. The phase separation of the LC bubbles occurs as the monomer is submitted to thermal- or photopolymerization, which decreases the solubility of the LC components in the polymer. In these LC/polymer films most of the liquid crystal is evenly dispersed in small bubbles, but a fraction is retained in the polymer as isotropic plasticizers or as microdroplets. When fully activated by an applied transverse field across the PDLC, the film changes from a light scattering off-state to a transparent on-state if the ordinary refractive index ($n_0$) of a highly birefringent positive dielectric anisotropy LC mixture is matched with the refractive index of the polymer.

It is believed that the pre-alignment effects described in this invention are related to the direction adopted by liquid crystal molecules bound to the surface of the droplet/polymer interface. In the off-state, the bulk of the LC within the droplet will adopt alignment directions consistent with the sum total of the surface alignment influences. The size and shape of the droplet will also affect the LC alignment, as well as the ability to control the pre-alignment. Uniform directional LC prealignment will generally be more difficult to obtain in small droplets due to the surface curvature.

Referring now to FIG. 3, another PDLC film 30 is shown in which the liquid crystal molecules within bubbles 32 have been brought into partial alignment during curing with an electric or magnetic field 34 generally in the plane of the film. This type of electrical field can be obtained with interdigitated electrodes on one or both surfaces. This orientation is desirable for applications in which a high degree of scattering is sought in the off-state, such as when the film is used as a shutter or diffusing screen, or as a birefringent film for the infrared region. Although in principle either an electric or a magnetic field could be used to partially align the liquid crystal molecules, a partial alignment in the film plane is easier to accomplish with a magnetic field. The application of a mechanical pressure to induce flow during cure, as described hereinafter, is also applicable to this type of liquid crystal orientation.

A number of factors enter into the degree of prealignment that is ultimately achieved. The strength of the applied electric or magnetic field is a primary consideration, particularly during the first few seconds of polymerization while the liquid crystal is separating out into bubbles. Another factor is the bubble size, which is turn is related to the intensity of UV irradiation during polymerization. The temperature during cure would also affect the degree of alignment, but depending upon the particular conditions the effect could be either positive or negative; the lower viscosity of the monomer with increasing temperature would tend towards a greater degree of alignment, but if the partition of liquid crystal between the bubbles and the polymer favors the polymer with increasing temperature, this would tend towards a lesser degree of alignment. The type of liquid crystal is another factor, with higher dielectric anisotropy LCs yielding a greater degree of alignment from an applied electrical field. The sample thickness and polymer resistivity also have an effect on the magnitude of the electrical field required.

PDLC films fabricated with a transverse electric field during photopolymerization showed lower operating signal requirements for both the threshold and the saturation voltages, together with a generally higher transmission in both the off-state and on-state. Electric field assisted polymerization may be especially advantageous for the fabrication of PDLC films requiring low operating voltages, particularly when the contrast ratio of displays is controlled by the high transmission of the on-state, or in which contrasts can be improved by the double path of a reflection mode display. Several examples obtained with the application of an electric field during polymerization are summarized below.

EXAMPLE 1

PDLC samples were fabricated from NOA-65 optical adhesive produced by Norland Products, Inc. of New Brunswick, N.J., and BDH-E7 (British Drug House Ltd.) cyanobiphenyl liquid crystal mixture in a 1:1 ratio, by volume. The two components were thoroughly mixed and drop-filled between ITO coated glass substrates with 0.5 mil Mylar ® spacers. A 60 volt AC signal was applied between the two ITO electrodes, while the isotropic liquid in the test cell was exposed to UV radiation from a 200 watt mercury lamp system with an optical water filter. The intensity of light transmitted through the resulting film was measured at a maximum wavelength of 365 nm with an IL-440 photoresist radiometer. The resulting transmission vs. voltage data is summarized in Table 1, and compared with the results for a cell that was formed in a similar manner but without an applied electric field during photopolymerization. The percent transmission in the off-state and at maximum transmission, the voltage threshold required to increase the optical transmission by 10% of the difference between the off and on states, and the voltage required for a transmission 50% between off and on are indicated.

TABLE 1

| Cell # | Voltage UV exposure | % $T_{off}$ | % $T_{100}$ | $V_{10}$ volts | $V_{50}$ volts |
|---|---|---|---|---|---|
| 1 | 60 | 37.0 | 92.0 | 2.4 | 5.6 |
| 2 | 0 | 0.5 | 94.0 | 8.5 | 24.0 |

EXAMPLE 2

Five test cells were set up in a manner similar to Example 1. Exposure conditions were the same as for Example 1, except the electric field applied during the photoexposure was regulated at 0, 5, 10, 20 and 30 volts for the five different test cells, respectively. Electrooptical characteristics for the various test cells were measured on a small acceptance angle optical set-up, and are summarized in FIG. 4. This data indicates that the electric field applied during UV exposure resulted in partial alignment of the LC directors within the bubbles, and provided lower threshold voltages, lower operating voltages and higher transmission levels through the resulting PDLC films. The pre-alignment effect on the PDLC films is substantial even with only 5 volts applied during UV curing, although after curing the application of 5 volts has little or no electro-optical effect.

EXAMPLE 3

A mixture of Norland NOA-65 and RO-TN-404 liquid crystal in a 2:1 volume ratio was placed in four test cells between ITO-coated substrates to fabricate transmissive test cells. Thickness was controlled by 0.5 mil Mylar ® spacers, and the four cells were polymerized with voltages across the electrodes of 0, 5, 20, and 30 volts, respectively. The transmission and voltage data obtained with these test cells is summarized in Table 2. Lower threshold and operating voltages and a higher off-state and on-state transmissions were observed in the samples cured in the presence of the field.

TABLE 2

| Cell # | Voltage UV exposure | % $T_{off}$ | % $T_{100V}$ | $V_{10}$ volts | $V_{50}$ volts |
|---|---|---|---|---|---|
| 1 | 0 | 1.0 | 87.5 | 38.9 | 47.5 |
| 2 | 5 | 5.9 | 91.0 | 30.2 | 39.8 |
| 3 | 20 | 28.4 | 92.2 | 20.0 | 40.4 |
| 4 | 30 | 57.0 | 89.8 | 14.7 | 31.8 |

The application of a magnetic field during the photopolymerization process can be utilized to obtain transverse, lateral, or tilted partial directional field alignment of the liquid crystal directors within the bubbles. A transverse magnetic field applied during polymerization was found to cause partial pre-alignment of the liquid crystal molecules, resulting in higher off-state and on-state transmissions without the use of a polarizer, and in reductions in the operating and threshold voltages. The application of a lateral magnetic field during curing resulted in better off-state scattering than did the transverse field application. Similarly, the polarization effect has been demonstrated for films polymerized with a lateral magnetic field (in the film plane). The polarization effect amplified the off-state scattering when polarized light was applied parallel to the general liquid crystal orientation, and this provided a higher contrast ratio as the magnetic field was increased from 0.4 to 14.1 Tesla (1 Tesla = 10 kGauss).

An experimental set-up for applying a magnetic field transverse to the film plane during polarization is shown in FIG. 5(a). The LC/monomer system 36 is contained between a pair of opposed transparent cell plates 38. UV light from a 200 watt mercury lamp 40 is focused by a lens 42 and directed by a pair of mirrors 44 and 46 in a transverse direction through the cell. A magnetic field in the film plane and perpendicular to the UV light was established between a pair of magnets 48, 50 located on opposite sides of the cell. The magnetic field strength was regulated between 0.4 and 14.1 Tesla.

A similar set-up shown in FIG. 5(b) was used to produce a magnetic field transverse to the film plane and parallel to the UV light beam during polymerization. Mirror 46 was omitted, and the transparent cell plates 38 were rotated 90°. Ultraviolet curing experiments were made with both the transverse and parallel set-ups, and also with the cell tilted 45° to the magnetic field.

EXAMPLE 4

A monomer/LC mixture as in Examples 1 and 2 was flow-filled into presealed, known thickness ITO-coated glass test cells. The sample's temperature and UV light intensity were controlled during three minute exposures at 12.5 mW/cm². Samples were positioned with the electrodes parallel, perpendicular and at 45° to the magnetic field direction during photopolymerization. Curing in the magnetic field affected the visible light scattering properties of the PDLC as shown by the level of off-state transmission, threshold voltage for transmission, contrast ratio and polarized light in FIGS. 6, 7, 8 and 9, respectively. In the resultant PDLC films it was found that the off-state transmission generally increased with increasing magnetic field strength during curing, while the threshold voltage decreased, and the contrast ratio decreased for unpolarized light. The contrast ratio for polarized light increased with the polarizer parallel to the lateral component of the magnetic field applied during UV curing of the PDLC film.

The directional partial pre-alignment obtained by forming the PDLC film in the presence of a strong magnetic field is also useful for the formation of films whose birefringence can be further tuned by application of an electrical field. Generally a lateral magnetic field is preferred when using LCs of positive dielectric anisotropy, while a transverse magnetic field is preferred with LCs of negative dielectric anisotropy. During the PDLC film formation, the lateral magnetic field should be tilted slightly off the plane of the electrode surface, while the transverse field should be tilted slightly off normal. This provides better pre-alignment directionality for further electro-optical modulation. Partial prealignment directionality can also be obtained with a combination of electrical and magnetic fields during PDLC formation, such as when using a low frequency electrical field with a crossover LC and superimposing a lateral magnetic field. The tunable birefringent effects are best observed when the wavelength of light is substantially larger than the LC droplet size in order to reduce light scattering. This corresponds to the infrared region for droplets in the general range of about 0.5 to 1.0 μm diameter. Light scattering can further be reduced by selecting the refractive indices such that the PDLC polymer index is between the indices of the LC, that is: $n_{e(LC)} > n_p > n_{o(LC)}$. A LC such as ZLI-1132 in Norland NOA-65 is one example of such a material system. A key advantage of infrared PDLC tunable birefringent cells is that their response times are fast because they are controlled largely by the LC droplet size, which is much smaller than the thickness of the LC layer in standard tunable birefringent infrared cells which have slower response times.

EXAMPLE 5

The tunable birefringent effect with dispersed liquid crystal droplets in a PDLC film was observed at 1.06 μm in a cell from Example 4 in which the PDLC was formed in the presence of a 14.1 Tesla lateral magnetic field. The results in FIG. 10(a) show the electro-optical properties of this cell placed between infrared polarizers with its pre-alignment direction rotated 45 with respect to the polarization direction of the incident infrared light. The maximum with crossed polarizers (or the minimum with parallel polarizers) at 20 V is due to the tunable birefringence effect. This was confirmed by observing the absence of such a maximum or minimum in a comparable cell formed in the presence of only 0.4 Tesla magnetic field, as shown in FIG. 10(b). Here the change in transmission with applied voltage (between parallel polarizers) is due to a reduction in the PDLC light scattering. Between crossed polarizers, the front slope response time of the birefringent effect is FIG. 10(a) (0–22 V) is 10 ms on and 26 ms off, while the back slope (40–22 V) is 30 ms on and 2 ms off (where the off time is from 22 to 40 V).

The present invention is also applicable to dual frequency liquid crystal systems. This is a class of liquid crystal mixtures having a positive dielectric anisotropy at low frequencies, and a negative dielectric anisotropy at high frequencies. In other words, in a PDLC film with a field applied beyond a low frequency threshold voltage, the amount of light transmitted will increase with voltage for low frequencies, but decrease for high frequencies. The frequency at which the transition from positive to negative dielectric anisotropy occurs is referred to as the crossover frequency $f_c$.

One application of this type of LC to the present invention is indicated in FIG. It illustrates the polymerization of a dual frequency system with an applied field at a high frequency above $f_c$, at which the liquid crystal has a negative dielectric anisotropy, and operation of the resultant PDLC film at a lower frequency below $f_c$, at which the liquid crystal has a positive dielectric anisotropy. The film has a high scattering off-state due to partial pre-alignment perpendicular to the applied field direction. With increasing voltage at the lower operating frequency it is changed to a relatively clear on-state. Little change of the scattering or alignment state would be produced if the system were operated at a higher frequency above $f_c$.

With a low frequency fabrication below $f_c$, the operating characteristics of the cell will depend upon the operating frequency. Operating frequencies below $f_c$ will produce results akin to those of FIG. 4, in which the film goes from scattering to transmissive with increasing voltage. For operation at frequencies above $f_c$, on the other hand, the film will go from a less to a more scattering on-state with increasing voltage.

EXAMPLE 6

Figure 12:
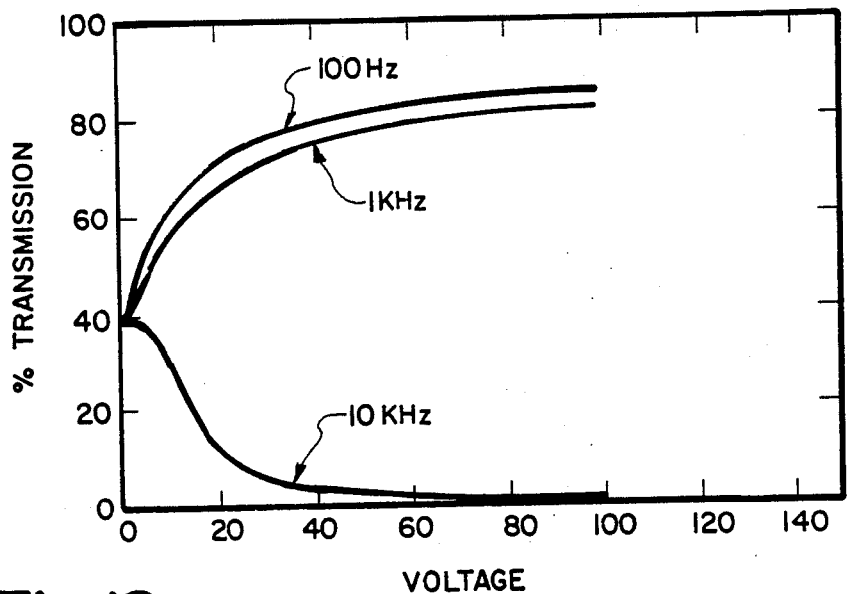
FIG. 12 is a graph comparing the voltage-transmission characteristics of a dual frequency film cured with and without an applied field.

The electro-optical effects of partial directional pre-alignment were studied at frequencies above and below $f_c$ in a PDLC film made with a crossover liquid crystal. An isotropic mixture was formed from Norland NOA-65 optical cement and a crossover LC in a 1:2 volume ratio. The LC mixture was made from a 1:1:1 weight ratio of three ortho-chloro substituted phenyl benzoyloxybenzoates, and it had a $f_c$ of 10 kHz at room temperature and of 80 kHz at 54° C. The monomer/LC solution was placed in a sample cell of ITO-coated glass electrodes separated by a 0.5 mil spacer. The sample was UV photopolymerized at 54° C. with a 50 V, 50 kHz signal across the electrodes. At this temperature and frequency (less than $f_c$) the LC mixture has a positive dielectric anisotropy, and tends to align in the direction of the field. After formation, voltagetransmission curves of this pre-aligned PDLC film are shown in FIG. 12 for both low and high frequency activation. In the off-state, this PDLC film showed a relatively high off-state transmission of 39%, due to the partial pre-alignment caused by curing it in the presence of an applied field. From this intermediate level of transmission, the PDLC film was activated either to a clearer or to a more scattering state, depending upon the applied voltage and its frequency. Room temperature operation below $f_c$, at 100 Hz and 1 kHz, where the LC has a positive dielectric anisotropy, resulted in high optical transmission at higher voltages. Operation above $f_c$ at 10 kHz, where the LC has a negative dielectric anisotropy, resulted in a highly scattering film at higher voltages. Using the unique properties of this partially pre-aligned crossover PDLC system, a field activated bi-stable device was thus obtained that could be electrically switched to either a transparent or to a highly scattering state by using different frequency signals. The time response of this system is about the same for switching to either the clear or the scattering state, thereby giving a faster response time than the usual decay time from clear to scattering when turning off the field in a normal PDLC film.

As described above, the use of magnetic fields to obtain partial liquid crystal alignment parallel to the film during polymerization provides very good contrast ratios when linearly polarized light is applied parallel to the liquid crystal director—see Example 4. An alternative method to obtain such partial surface-parallel directional alignment is to photopolymerize the film while the solution is flowing in a given direction. As the LC separates it is partially aligned in the direction of the flow, resulting in a PDLC film with partial pre-alignment in the flow direction.

Figure 13:
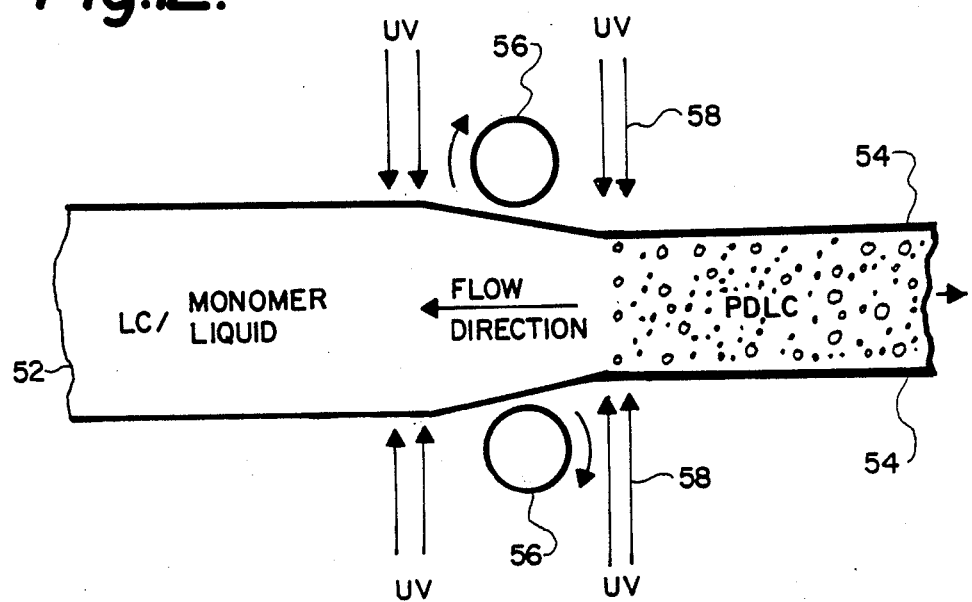
FIG. 13 is a block diagram illustrating a partial liquid crystal flow alignment during cure by the application of mechanical squeezing to directionally flow the monomer/LC solution being cured.

A suitable manufacturing technique is illustrated in FIG. 13. An LC/monomer solution 52 is contained between flexible ITO sheets 54. The system is fed between rollers 56 which squeeze down the sheets to the dimension of internal spacers (not shown), while ultraviolet light 58 is applied to polymerize the monomer and produce liquid crystal bubbles. The squeezing effect causes flow just as the LC bubbles are formed, resulting in partial alignment of the LC bubbles. Dyes could also be incorporated in the liquid crystal to further increase the contrast. This technique, with or without dyes, may be a practical and economical method of manufacturing large area plastic LC films with a controlled amount of partial LC alignment for high contrast displays. The degree of partial alignment in the film plane would depend upon the amount of squeezing and the rate of polymerization.

A unique type of PDLC film that offers low threshold and operating voltages, and also relatively simple and inexpensive fabrication techniques for the film, have thus been shown and described. As numerous variations and alternate embodiments will occur to those skilled in the art, it is intended that the invention be limited only in terms of the appended claims.

We claim:

1. A method for forming a polymer dispersed liquid crystal (LC) film, comprising:
   forming a solution of a LC dissolved in a polymerizable monomer system,
   polymerizing said solution to form a polymerized film having a dispersion of LC bubbles therein,
   causing the LC molecules within said bubbles to partially align in a predetermined direction during said polymerization, and
   controlling said direction of the LC molecules during polymerization so that substantially less than full alignment in said predetermined direction is achieved, thereby providing the film with a relatively low threshold voltage for optical transmission, and a relatively high optical contrast ratio over a predetermined voltage range.

2. The method of claim 1, wherein said LC molecules are partially aligned within said bubbles by applying an electric field to said solution during polymerization, the field strength being sufficient to partially align but substantially less than that necessary to fully align the LC molecules.

3. The method of claim wherein said LC molecules are partially aligned within said bubbles by applying a magnetic field to said solution during polymerization, the field strength being sufficient to partially align but substantially less than that necessary to fully align the LC molecules.

4. The method of claim 1, wherein said LC molecules are partially aligned within said bubbles by polymerizing said solution and simultaneously flowing it in a given direction with a flow sufficient to partially align the LC in the flow direction.

5. The method of claim 4, wherein the flow of the said solution during polymerization is obtained by placing the said solution between sheets, and squeezing the sheets together by passing them between a pair of opposed rollers as the solution is being polymerized.

6. The method of claim 1, the LC molecules comprising a crossover LC having a positive dielectric anisotropy below a crossover frequency and a negative dielectric anisotropy above said crossover frequency, wherein said LC molecules are partially aligned within said bubbles by applying an electric or magnetic AC field to said solution during polymerization, the field strength being sufficient to partially align but substantially less than that necessary to fully align the LC molecules, and the frequency of the applied field is selected relative to said crossover frequency in accordance with the desired operating characteristics for the film.

7. A method of forming a polymer dispersed liquid crystal (LC) film having a birefringence that is tunable in accordance with the magnitude of a voltage applied across the film, comprising:
   forming a solution of a LC dissolved in a polymerizable monomer system,
   photopolymerizing said solution with ultraviolet light exposure to form a polymerized film having a dispersion of LC bubbles therein, and
   partially aligning the LC molecules within said bubbles in a predetermined direction so that the birefringence of the polymer dispersed LC film can be varied with an applied electrical field.

8. The method of claim 7, wherein said LC molecules are partially aligned within said bubbles by applying an electric field to said solution during polymerization, the field strength being sufficient to partially align but substantially less than that necessary to fully align the LC molecules.

9. The method of claim 7, wherein said LC molecules are partially aligned within said bubbles by applying a magnetic field to said solution during polymerization, the field strength being sufficient to partially align but substantially less than that necessary to fully align the LC molecules.

10. The method of claim 7, wherein said LC molecules are partially aligned within said bubbles by forming said solution in a sheet, and squeezing said sheet during polymerization sufficiently to cause said solution to flow and partially align the LC molecules in the flow direction.

11. The method of claim 10, wherein said sheet is compressed by passing it between a pair of opposed rollers.

12. The method of claim 6, the LC comprising a dual frequency LC having a positive dielectric anisotropy below a crossover frequency and a negative dielectric anisotropy above said crossover frequency, wherein said LC molecules are partially aligned within said bubbles by applying an electric or magnetic field to said solution during polymerization, the field strength being sufficient to partially align but substantially less than that necessary to fully align the LC molecules, and the frequency of the applied field is selected relative to said crossover frequency in accordance with the desired operating characteristics for the film.

13. A polymer dispersed liquid crystal (LC) film having improved threshold and operating voltage characteristics, comprising:
   a polymerized monomer system in the form of a film, and
   an array of LC bubbles dispersed through said system, said bubbles each comprising a plurality of LC molecules that are partially aligned in a predetermined direction, the degree of LC alignment being great enough to substantially reduce the voltage threshold for optical transmission through the film relative to nonaligned LC molecules, but less than that at which the film becomes transparent in the off-state.

14. The polymer dispersed LC film of claim 13, wherein the LC molecules are partially aligned generally parallel to the film plane.

15. The polymer dispersed LC film of claim 13, wherein the LC molecules are partially aligned generally perpendicular to the film plane.

* * * * *

UNITED STATES PATENT AND TRADEMARK OFFICE
CERTIFICATE OF CORRECTION

PATENT NO. : 4,944,576

DATED : July 31, 1990

INVENTOR(S) : ANNA M. LACKNER ET AL.

It is certified that error appears in the above-identified patent and that said Letters Patent is hereby corrected as shown below:

IN CLAIM 3, column 11, line 1, after "method of claim" insert therefor --1--.

Signed and Sealed this

Twenty-seventh Day of October, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO.  : 4,944,576
DATED       : July 31, 1990
INVENTOR(S) : Anna M. Lackner et al It is certified that error appears in the above-identified patent and that said Letters Patent is hereby corrected as shown below:

On the title page, item (75) Inventors, change:

"ANNA M. LACKER" to read --ANNA M. LACKNER--.

Signed and Sealed this

Twenty-eighth Day of September, 1993

Attest:

BRUCE LEHMAN

Attesting Officer

Commissioner of Patents and Trademarks